United States Patent
De Jong et al.

(10) Patent No.: US 12,459,221 B2
(45) Date of Patent: Nov. 4, 2025

(54) METHOD FOR PRODUCING A TORSION BOX FOR A STRUCTURE OF AN AIRPLANE AND A TORSION BOX FOR A STRUCTURE OF AN AIRPLANE

(71) Applicant: Airbus Operations GmbH, Hamburg (DE)

(72) Inventors: Claas De Jong, Stade (DE); René Schröder, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 377 days.

(21) Appl. No.: 17/535,885

(22) Filed: Nov. 26, 2021

(65) Prior Publication Data

US 2022/0080686 A1 Mar. 17, 2022

Related U.S. Application Data

(63) Continuation of application No. PCT/IB2020/000903, filed on Aug. 31, 2020.

(30) Foreign Application Priority Data

Aug. 28, 2019 (DE) ...................... 10 2019 123 012.8

(51) Int. Cl.
*B64C 1/06* (2006.01)
*B29C 65/02* (2006.01)
(Continued)

(52) U.S. Cl.
CPC .......... *B29D 24/008* (2013.01); *B29C 65/022* (2013.01); *B29C 65/48* (2013.01);
(Continued)

(58) Field of Classification Search
CPC .... B64C 1/12; B64C 3/20; B64C 3/26; B64C 3/182; B64C 3/187; B64C 1/064;
(Continued)

(56) References Cited

U.S. PATENT DOCUMENTS 1,603,051 A 10/1926 Hall
2,233,969 A * 3/1941 Woods ................... B64C 3/187
244/123.8
(Continued)

FOREIGN PATENT DOCUMENTS

EP 3 254 950 A1 12/2017
WO WO 2014/065719 A1 5/2014
WO WO 2014/175795 A1 10/2014

OTHER PUBLICATIONS

German Search Report for Application No. 102019123012 dated Mar. 3, 2020.
(Continued)

*Primary Examiner* — Joshua J Michener
*Assistant Examiner* — Colin Zohoori
(74) *Attorney, Agent, or Firm* — KDW Firm PLLC

(57) ABSTRACT

A method for producing a torsion box for a structure of an airplane. The method includes providing a first component made of a fiber composite material, the first component has a first planar base having a first inner side and a first outer side, first stiffening elements on the first inner side forming a composite with the first base. A second component is provided of a fiber composite material and has a second planar base having a second inner side and a second outer side. Second stiffening elements are on the second inner side and form a composite with the second base. The method includes superimposing the first component and the second component such that the first stiffening elements lie, at least in some areas, on the second inner side and the second stiffening elements lie, at least in some areas, on the first inner side. The methods includes connecting the first stiffening elements to the second base and connecting the second stiffening elements to the first base.

17 Claims, 2 Drawing Sheets

(51) Int. Cl.
    *B29C 65/48*     (2006.01)
    *B29C 65/60*     (2006.01)
    *B29D 24/00*     (2006.01)
    *B64C 3/18*     (2006.01)
    *B64F 5/10*     (2017.01)

(52) U.S. Cl.
    CPC .............. *B29C 65/60* (2013.01); *B64C 1/064* (2013.01); *B64C 1/065* (2013.01); *B64C 3/185* (2013.01); *B64C 3/187* (2013.01); *B64F 5/10* (2017.01)

(58) Field of Classification Search
    CPC ........... B64C 1/065; B64C 3/18; B64C 3/185; B29D 24/008; B29C 65/22; B29C 65/48; B29C 65/66
    See application file for complete search history.

(56) References Cited

U.S. PATENT DOCUMENTS

| | | | | |
|---|---|---|---|---|
| 4,310,132 A * | 1/1982 | Frosch | .................... | B64C 1/068 |
| | | | | 244/119 |
| 4,739,954 A | 4/1988 | Hamilton | | |
| 5,501,414 A * | 3/1996 | Bauer | ..................... | B64C 3/18 |
| | | | | 416/233 |
| 6,638,466 B1 * | 10/2003 | Abbott | .................... | B29C 33/68 |
| | | | | 264/258 |
| 7,182,293 B2 * | 2/2007 | Sarh | .......................... | B64F 5/10 |
| | | | | 244/123.7 |
| 9,387,922 B2 * | 7/2016 | Guinaldo Fernandez | ................... | |
| | | | | B64C 3/187 |
| 2003/0042364 A1 * | 3/2003 | Tanaka | ..................... | B64C 3/20 |
| | | | | 244/123.2 |
| 2004/0056152 A1 * | 3/2004 | Yamashita | ................ | B64C 3/18 |
| | | | | 244/123.8 |
| 2008/0128552 A1 * | 6/2008 | Namaizawa | .............. | B64C 3/18 |
| | | | | 244/123.1 |
| 2009/0314892 A1 * | 12/2009 | Kunichi | .................. | B64C 3/187 |
| | | | | 244/123.1 |
| 2015/0183506 A1 * | 7/2015 | Garc A Mart N | ........ | B64F 5/10 |
| | | | | 244/129.1 |
| 2016/0176499 A1 * | 6/2016 | Evans | .................... | B64C 3/185 |
| | | | | 244/123.1 |
| 2017/0174313 A1 * | 6/2017 | Brakes | .................... | B64C 25/00 |
| 2017/0334541 A1 | 11/2017 | Williams | | |
| 2018/0086429 A1 * | 3/2018 | Sheppard | .................. | B64C 9/00 |
| 2018/0155006 A1 | 6/2018 | Arana Hidalgo et al. | | |
| 2022/0135203 A1 * | 5/2022 | Mcnaught | ................. | B64C 3/34 |
| | | | | 244/123.8 |

OTHER PUBLICATIONS

International Search Report and Written Opinion for Application No. PCT/IB2020/000903 dated Jan. 28, 2021.

* cited by examiner

METHOD FOR PRODUCING A TORSION BOX FOR A STRUCTURE OF AN AIRPLANE AND A TORSION BOX FOR A STRUCTURE OF AN AIRPLANE

CROSS-REFERENCE TO RELATED APPLICATIONS

This application is a continuation of and claims priority to PCT/IB2020/000903 filed Aug. 31, 2020, which claims priority to German Patent Application No. 10 2019 123 012.8 filed Aug. 28, 2019, the entire disclosures of which are incorporated by reference herein.

TECHNICAL FIELD

The disclosure herein relates to a method for manufacturing a torsion box for a structure of an aircraft and to a torsion box for a structure of an aircraft.

BACKGROUND

Large-size components made of a fiber composite material can be manufactured using different methods. Apart from transfer molding techniques, vacuum infusion processes are also widespread. These methods are based on the use of forming tools, which define a form of the corresponding component which is to be manufactured and are provided with a scrim made of one or multiple layers of a semi-finished fiber product. In order to impregnate the semi-finished fiber product with resin, the scrim that has been produced is frequently covered with a vacuum film. This is relatively simple in the case of flat components, since the vacuum film can easily follow the flat extent of the component concerned. If, however, elongate stiffening components extending parallel to one another are wanted on an inner side of the respective component, for example, the vacuum film must also be flush with the stiffening components and the gaps lying therebetween. Wrinkling must be prevented in this case, in order to ensure the dimensional accuracy and integrity of the component.

Stiffening components which are significantly more complex in some cases are provided, particularly in the case of commercial aircraft which comprise, at least in part, large-sized components produced from fiber composite materials. In the case of so-called torsion boxes, which are designed to absorb relatively large bending moments, stiffening components can also run transversely to one another and partially overlap. For this reason, it is commonplace for flat shells to be produced for the manufacture of torsion boxes and for separately produced stiffening components to be riveted to the shells or connected to them in some other way. The manufacturing effort required for this is substantial, and when the riveted connections are made, a fiber course has to be adapted or dimensioned accordingly.

SUMMARY

A problem addressed by the disclosure herein is that of proposing a method for manufacturing a torsion box for a structure of an aircraft, in which the amount of work can be reduced without this giving rise to a different design or a higher weight for the torsion box being produced.

The problem is solved by a method disclosed herein. Advantageous embodiments and developments can be inferred from the disclosure herein.

A method for manufacturing a torsion box for a structure of an aircraft is proposed, the method comprising the steps of provision of a first component made of a fiber composite material, the first component having a first flat base with a first inner side and a first outer side, wherein multiple first stiffening elements are arranged on the first inner side and form a composite with the first base, provision of a second component made of a fiber composite material, the second component comprising a second flat base with a second inner side and a second outer side, wherein multiple second stiffening elements are arranged on the second inner side and form a composite with the second base, superimposition of the first component and the second component in such a manner that the first stiffening elements lie, at least in some areas, on the second inner side, and the second stiffening elements lie, at least in some areas, on the first inner side, and connection of the first stiffening elements to the second base and connection of the second stiffening elements to the first base.

A torsion box of this kind could be a component of a wing, of a horizontal stabilizer, of a vertical stabilizer, of a landing flap, or of another structural component or of a structure, for example. The torsion box describes a hollow structural component which is designed to absorb a bending moment about at least one axis. The torsion box may have different shapes, ranging from more cube-shaped to more elongate cuboid or flatter forms. The walls of the torsion box need not be flat, but they may also have more or fewer significant curvatures. The torsion box is characterized below by two planar, shell-like components in the form of the first base and the second base, which are spaced apart from one another and include first and second stiffening elements. It is particularly advantageous for the first component and the second component to be manufactured in the manner described above.

The first flat base is provided with first stiffening elements which form a composite with the first base. As explained above, this may include the production of scrims and subsequent infiltration and curing. For this purpose, a closing device is arranged on the scrim, in order to carry out the infiltration and during the curing. The closing device may get into gaps between the first stiffening elements, for example. As an alternative to this, the gaps may also be temporarily covered with stiffening elements, so that the closing device then jointly covers the scrims and the stiffening elements.

This can be carried out in a particularly advantageous manner when restricted to the first stiffening elements or the second stiffening elements, because a flexible closing device can follow uniformly arranged and completely continuous gaps without wrinkling. On the other hand, after curing, the stiffening elements can also be pushed out of the first component or the second component in one direction.

This results in first and second components which can be produced simply and with conventional tools and which eliminate the need for some of the connections required in the prior art. The first flat base and the first stiffening elements, as well as the second flat base and the second stiffening elements, each form a cohesive, non-joined component with internal stiffening. The superimposition allows the torsion box to be produced by connecting the stiffening components on one side in each case. The work involved in fastening the individual components to one another is therefore essentially halved.

When using riveted connections, approximately half the corresponding bores are necessary, so that an improvement in the flow of force and the mechanical adjustments needed for the riveted connections can be expected, compared with exclusively riveted components.

In an advantageous embodiment, the provision of the first component or of the second component comprises the formation of scrims on a molding tool, the covering of the scrims with a closing device, the impregnation of the scrims with a resin, the curing, and the removal of the closing device. In particular, the method could be implemented in the form of a vacuum infusion technique or as a resin transfer molding (RTM) process. The scrim is sealed all round on the molding tool by a closing device, for example a vacuum film, so that it is encapsulated on the molding tool in an airtight and consistently shaped manner. The term "resin" within the meaning of the disclosure herein may comprise any matrix material which is suitable for forming a fiber composite component with a fiber material. The matrix material in this case may also already contain a hardener (multi-component resin system). Resin may, in the narrower sense, refer to thermosetting plastics, such as epoxy resin systems, for example. However, thermoplastics should not be excluded either.

The formation of scrims could comprise the arrangement of a base scrim to form the base and of stiffening scrims to form the stiffening elements. Consequently, a one-piece composite component is made possible by joint curing of fabrics impregnated with resin, which has particularly advantageous mechanical properties in the transitional region between stiffening components and base and is relatively lightweight.

In an advantageous embodiment, the first stiffening elements and/or the second stiffening elements are adhered or welded to their associated base, in order to form the composite with the associated base. Welding is particularly suitable for a base and stiffening elements based on a material with a thermoplastic matrix. Adhesion is largely conceivable for all materials, which also include thermosets.

The first stiffening elements or the second stiffening elements particularly preferably extend along the same spatial direction. If multiple stiffening elements are arranged on the respective base, they are arranged parallel to one another. The gaps between the stiffening elements can easily be covered with a flexible closing device in an accurately shaped manner and without wrinkling. The spacings could be variably configured, as could the individual structural heights or vertical extensions of the cross-sectional profiles.

The connection preferably involves the production of riveted connections. The first component and the second component are therefore riveted to one another at their connection points. However, the number of riveted connections is only about half that of the riveted connections in the known methods of manufacturing a torsion box as described above.

In an advantageous embodiment, the second stiffening elements are aligned transversely to the first stiffening elements. The separate production of the stiffening elements on the respective base allows the stiffening elements to be nested subsequently for the robust construction of the torsion box, without making the scrims difficult to cover.

The first stiffening elements are designed to be at least partially interrupted in some areas, in order to realize the second stiffening elements. The first and second stiffening elements can thereby form a grid within the torsion box.

The first stiffening elements are preferably designed as stiffening ribs. The second stiffening elements can more preferably be designed as spars.

The disclosure herein further relates to a torsion box for a structure of an aircraft, comprising a first component made of a fiber composite material, the first component having a first flat base with a first inner side and a first outer side, multiple first stiffening elements being arranged on the first inner side and forming a composite with the first base, and a second component made of a fiber composite material, the second component having a second flat base with a second inner side and a second outer side, wherein multiple second stiffening elements are arranged on the second inner side and form a composite with the second base, wherein the first base and the second base are superimposed on one another in such a manner that the first stiffening elements lie on the second inner side, at least in some areas, and the second stiffening elements lie on the first inner side, at least in some areas, and wherein the first stiffening elements and the second base and the second stiffening elements and the first base are connected to one another in a form-fitting, force-fitting or substance-bonded manner.

The first stiffening elements are particularly preferably designed as stiffening ribs, the second stiffening elements being designed as spars and the first and second stiffening elements being arranged transversely to one another.

The disclosure herein also relates to an aircraft comprising at least one component which has a torsion box, according to the preceding description.

BRIEF DESCRIPTION OF THE DRAWINGS

Further features, advantages and possible applications of the disclosure herein emerge from the following description of the example embodiments and the figures. All of the features described and/or depicted in the figures, individually and in any combination, form the subject matter of the disclosure herein, regardless of their composition in the individual claims or their dependencies. In the figures, the same reference signs continue to be used for the same, or similar, objects.

FIG. 1 shows a schematic, block-based diagram of a method for manufacturing a torsion box for a structure of an aircraft.

DETAILED DESCRIPTION

Figure 2A:
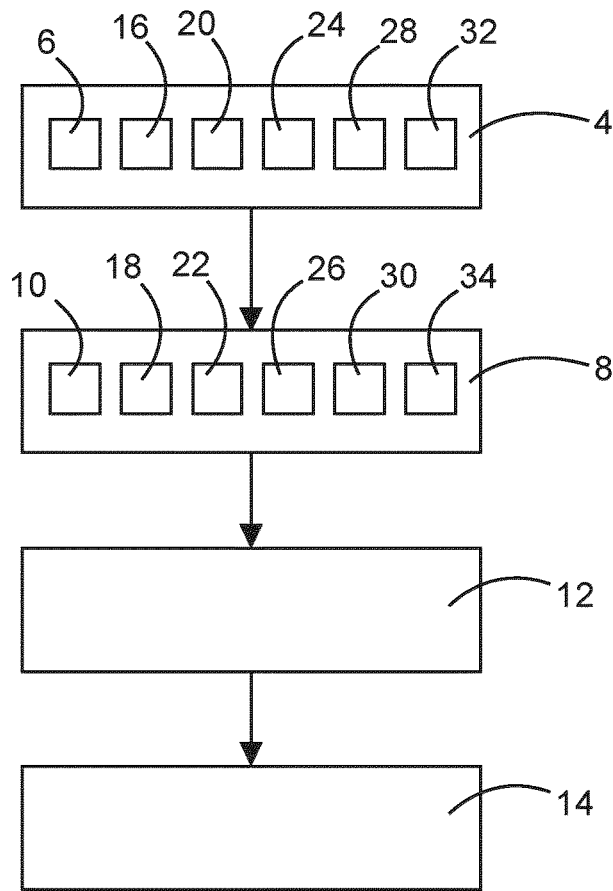
FIGS. 2A and 2B show the first and the second component in two different views.

FIG. 1 shows a method 2 for manufacturing a torsion box for a structure of an aircraft. According to the block diagram shown, the method may comprise the following steps. To begin with, a first component made of a fiber composite material is provided 4, which component has a first flat base with a first inner side and a first outer side, wherein multiple first stiffening elements are arranged on the first inner side 6 and form a composite with the first base. A second component made of a fiber composite material is then provided 8. The second component has a second flat base with a second inner side and a second outer side, wherein multiple second stiffening elements are arranged on the second inner side 10 and form a composite with the second base. The first component and the second component are then superimposed on one another 12, in such a manner that the first stiffening elements lie on the second inner side, at least in areas, and the second stiffening elements lie on the first inner side, at least in areas. The first stiffening elements are then connected to the second base and the second stiffening elements to the first base 14. The provision 4 or 8 may involve the formation 16 or 18 of first or second scrims on a forming tool, the covering 20 or 22, the impregnation 24 or 26 with a resin, the curing 28 or 30, and the removal 32 or 34. The formation 16 or 18 of the scrims may include the arrangement 16a of a base scrim for formation of the base and the arrangement of stiffening scrims 16b for formation of the stiffening elements. The connection 14 may involve the making of riveted connections.

Figure 2B:
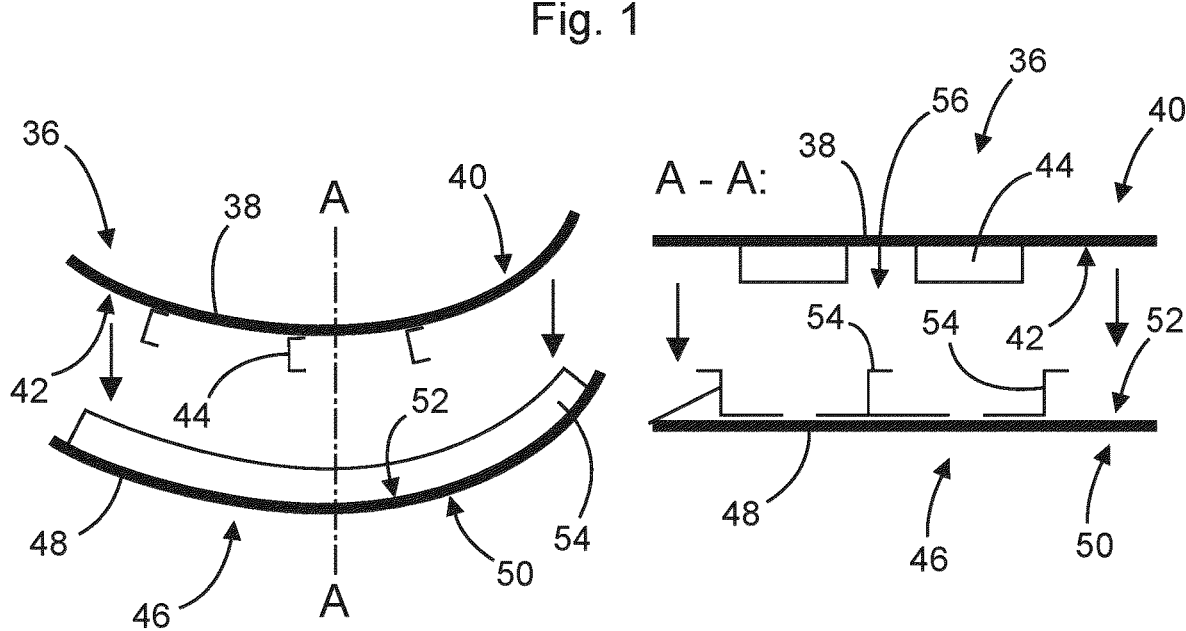

FIGS. 2A-2B show a first component 36 which comprises a first flat base 38. The first base 38 has a first outer side 40 and a first inner side 42. First stiffening elements 44 are arranged on the first inner side 42 and extend parallel to one another along the same direction and are configured as ribs, for example. By way of example, the first base 38 and the first stiffening elements 44 are configured as a coherent scrim and can be jointly infiltrated with resin and cured.

A second component 46 has a second base 48 with a second outer side 50 and a second inner side 52. There are second stiffening elements 54 located on top of the base which are designed as spars. As can be seen in the sectional depiction, which is characterized as A-A in the right drawing plane, the first stiffening elements 44 have multiple interruptions 56 through which the second stiffening elements 54, which are arranged transversely to the first stiffening elements 44, can run. The first component 36 and the second component 46 are superimposed on one another and connected to one another.

Figure 3A:
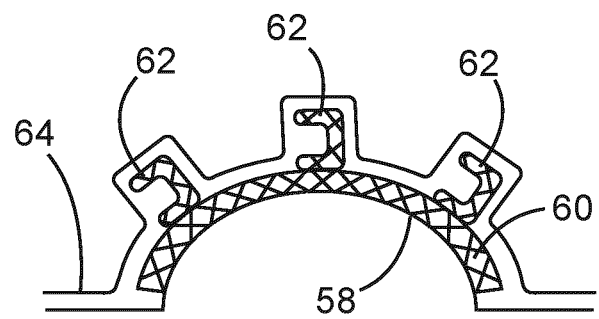
FIGS. 3A and 3B show the manufacture of a first component on a forming tool.

FIG. 3A shows in highly schematic form a forming tool 58, on which a first base scrim 60 is placed to form the first base 38. Attached to this are first stiffening scrims 62 which are arranged on the first base scrim 60. A first closing device 64 is placed over the scrim 60 and 62 and ends flush with the forming tool 58. Gaps between the first stiffening scrims 62 are likewise covered by the closing device 64. The infiltration with resin and subsequent curing can take place in this position. The method shown relates, in particular, to a vacuum infusion process.

Figure 3B:
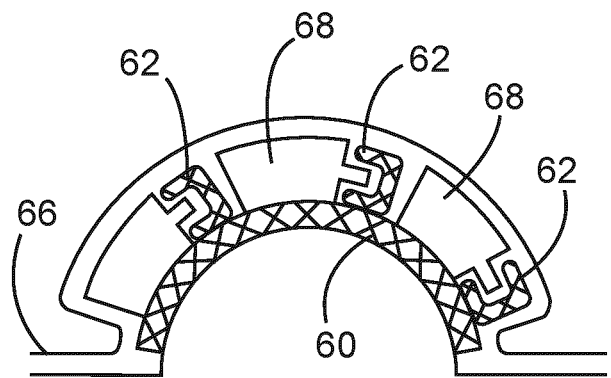

A slightly modified variant, in which the first base scrim 60 and the first stiffening scrims 62 are arranged on top of one another, is shown in FIG. 3B. A different first closing device 66 is selected in this case, which does not run into gaps between the first stiffening scrims 62. Instead of this, first stiffeners 68 are arranged there, which supplement the gaps in a radial direction and are covered by the first closing mechanism 66. After curing, they are removed again in a direction parallel to the first stiffening scrims 62 or the first stiffening elements which result. For this purpose, it is particularly favorable for all the stiffening scrims 62 to run in the same direction. The first stiffeners 68 can then 10 be drawn out in the same direction. This depiction relates, in particular, to an RTM method.

Devices formed in a similar manner to FIG. 3A or 3B are used for the manufacture of the second component 46.

Figure 4:
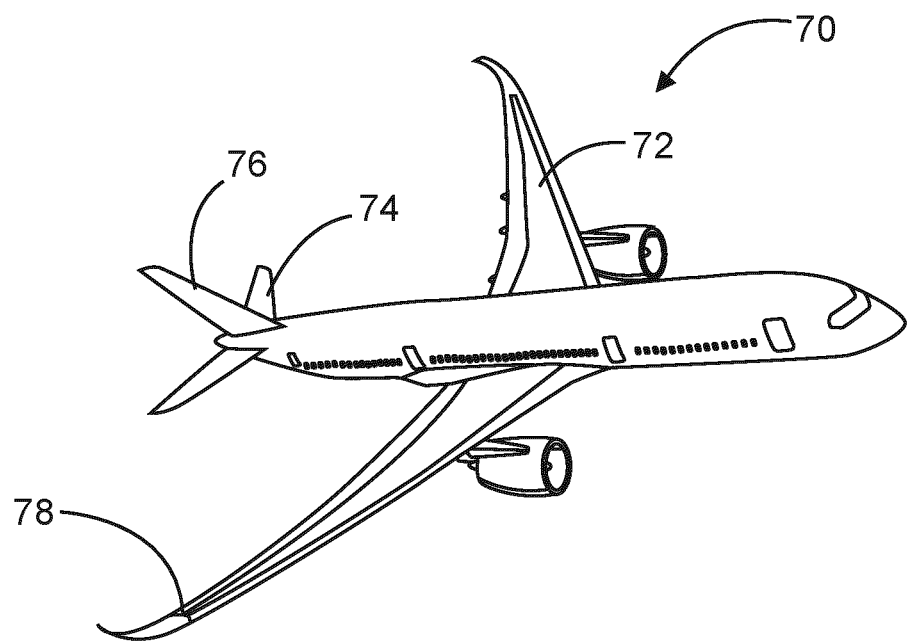
FIG. 4 shows an aircraft which has a torsion box.

FIG. 4 shows an aircraft 70 which has multiple structural components in the form of wings 72, horizontal stabilizers 74, and a vertical stabilizer 76. At least one of these structural components 72, 74 and 76 may be fitted with a torsion box manufactured as previously depicted. By way of example, a torsion box 78 is depicted using dotted lines at one end of one of the wings 72.

In addition, it should be pointed out that "comprising" does not exclude other elements or steps, and "a" or "an" does not preclude a plurality. In addition, it should be pointed out that features which have been described with reference to one of the above example embodiments can also be used in combination with other features of other example embodiments described above. Reference signs in the claims should not be regarded as a limitation.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 method
4 provision of first component
6 arrangement of first stiffening elements
8 provision of second component
10 arrangement of second stiffening elements
12 superimposition
14 connection
16 formation of first scrim
18 formation of second scrim
20 covering of first scrim
22 covering of second scrim
24 impregnation of first scrim
26 impregnation of second scrim
28 curing of first scrim
30 curing of second scrim
32 removal of closing device
34 removal of closing device
36 first component
38 first base
40 first outer side
42 first inner side
44 first stiffening elements
46 second component
48 second base
50 second outer side
52 second inner side
54 second stiffening elements
56 interruptions
58 forming tool
60 first base scrim
62 first stiffening scrims
64 first closing device
66 first closing device
68 first stiffeners
70 aircraft
72 wing
74 horizontal stabilizer
76 vertical stabilizer
78 torsion box

The invention claimed is:

1. A method for manufacturing a torsion box for a structure of an aircraft, the method comprising:
    forming a first component by:
        providing a first flat base with a first flat inner side and a first outer side; and welding multiple first stiffening elements onto and in direct contact with the first flat inner side of the first flat base to form with the first flat base a one-piece composite component, wherein the first stiffening elements comprise multiple longitudinally extending ribs that have a same profile or shape as the first flat inner side of the first flat base;

wherein the first flat base and the multiple first stiffening elements are made of a fiber composite material comprising a fabric impregnated with a resin as a matrix material; and wherein the first flat inner side has a same flat shape as the first outer side;

forming a second component by:
providing a second flat base with a second flat inner side and a second outer side; and
welding multiple second stiffening elements onto the second flat inner side of the second flat base to form with the second flat base a one-piece composite component, wherein the second stiffening elements comprise multiple longitudinally extending spars that have a same profile or shape as the second flat inner side of the second flat base;
wherein the second flat base and the multiple second stiffening elements are made of a fiber composite material comprising a fabric impregnated with a resin as a matrix material;

superimposing the first component and the second component such that the first stiffening elements lie, at least in some areas, on the second flat inner side and the second stiffening elements lie, at least in some areas, directly on the first flat inner side;

connecting the first stiffening elements to the second flat base; and connecting the second stiffening elements directly to the first flat base;

wherein the multiple longitudinally extending ribs extend in a first direction, the multiple longitudinally extending spars extend in a second direction, and the first direction is transverse to the second direction;

wherein each of the longitudinally extending ribs are formed as discontinuous elements that are separated from each other in the first direction by one of a plurality of gaps, such that each of the discontinuous elements does not touch any of the other discontinuous elements of a same one of the longitudinally extending ribs;

wherein the longitudinally extending spars extend through a corresponding one of the plurality of gaps; and wherein the first direction is a chord direction of the torsion box and the second direction is a wingspan direction of the torsion box.

2. The method of claim 1, wherein forming the first component or the second component comprises:
forming scrims on a molding tool;
covering the scrims with a closing device;
impregnating the scrims with a resin;
curing the scrims impregnated with the resin; and
removing the closing device.

3. The method of claim 2, wherein:
the scrims comprise a base scrim and stiffening scrims; and
forming the scrims comprises:
arranging the base scrim to form the first or second flat base; and
arranging the stiffening scrims to form the first or second stiffening elements, respectively.

4. The method of claim 1, wherein:
connecting the first stiffening elements to the second flat base comprises riveting the first stiffening elements to the second flat base; and
connecting the second stiffening elements to the first flat base comprises riveting the second stiffening elements to the first flat base.

5. The method of claim 1, wherein the first stiffening elements or the second stiffening elements extend along a same spatial direction.

6. The method of claim 1, wherein:
connecting the first stiffening elements to the second flat base comprises riveting the first stiffening elements to the second flat base; or
connecting the second stiffening elements to the first flat base comprises riveting the second stiffening elements to the first flat base.

7. The method of claim 2, wherein:
connecting the first stiffening elements to the second flat base comprises riveting the first stiffening elements to the second flat base; and/or
connecting the second stiffening elements to the first flat base comprises riveting the second stiffening elements to the first flat base.

8. The method of claim 1, wherein the second flat inner side has a same flat shape as the second outer side.

9. The method of claim 8, wherein:
the first flat inner side is flat along an entire length of each the first stiffening elements; and
the second flat inner side is flat along an entire length of each the second stiffening elements.

10. The method of claim 1, wherein the second flat inner side has a same flat shape as the second outer side.

11. A torsion box for a structure of an aircraft, the torsion box comprising:
a first component comprising:
a first flat base with a first flat inner side and a first outer side; and
multiple first stiffening elements that are welded onto and in direct contact with the first flat inner side of the first flat base to form with the first flat base a one-piece composite component, wherein the first stiffening elements comprise multiple longitudinally extending ribs that have a same profile or shape as the first flat inner side of the first flat base;
wherein the first flat base and the multiple first stiffening elements are made of a fiber composite material comprising a fabric impregnated with a resin as a matrix material;
wherein the first flat inner side has a same flat shape as the first outer side; and
a second component comprising:
a second flat base with a second flat inner side and a second outer side; and
multiple second stiffening elements that are welded onto the second flat inner side of the second flat base to form with the second flat base a one-piece composite component, wherein the second stiffening elements comprise multiple longitudinally extending spars that have a same profile or shape as the second flat inner side of the second flat base;
wherein the second flat base and the multiple second stiffening elements are made of a fiber composite material comprising a fabric impregnated with a resin as a matrix material;

wherein the first flat base and the second flat base are superimposed such that the first stiffening elements lie, at least in some areas, on the second flat inner side, and the second stiffening elements lie, at least in some areas, directly on the first flat inner side;

wherein the first stiffening elements and the second flat base are connected to one another in a form-fitting, force-fitting, or substance-bonded manner;

wherein the second stiffening elements and the first flat base are directly connected to one another in a form-fitting, force-fitting, or substance-bonded manner;

wherein the multiple longitudinally extending ribs extend in a first direction, the multiple longitudinally extending spars extend in a second direction, and the first direction is transverse to the second direction;

wherein each of the longitudinally extending ribs are formed as discontinuous elements that are separated from each other in the first direction by one of a plurality of gaps, such that each of the discontinuous elements does not touch any of the other discontinuous elements of a same one of the longitudinally extending ribs;

wherein the longitudinally extending spars extend through a corresponding one of the plurality of gaps; and wherein the first direction is a chord direction of the torsion box and the second direction is a wingspan direction of the torsion box.

12. The torsion box of claim 11, wherein:
the first stiffening elements are riveted to the second flat base; and/or
the second stiffening elements are riveted to the first flat base.

13. An aircraft comprising at least one structural component, in which at least one torsion box of claim 11 is integrated.

14. The torsion box of claim 11, wherein:
since the ribs are formed as discontinuous elements, when the first component and the second component are superimposed, there are gaps between the ribs, which are coaxial with each other in the first direction; and
the spars are arranged on the second flat inner side so that, when the first component and the second component are superimposed, each of the spars is positioned within a corresponding one of the gaps.

15. The torsion box of claim 11, wherein the second flat inner side has a same flat shape as the second outer side.

16. The torsion box of claim 15, wherein:
the first flat inner side is flat along an entire length of each the first stiffening elements; and
the second flat inner side is flat along an entire length of each the second stiffening elements.

17. The torsion box of claim 11, wherein the second flat inner side has a same flat shape as the second outer side.

* * * * *